Oct. 14, 1969 R. A. WIECZOREK 3,473,054
TIME DELAY CIRCUIT WITH FIELD-EFFECT TRANSISTOR
Filed April 29, 1966
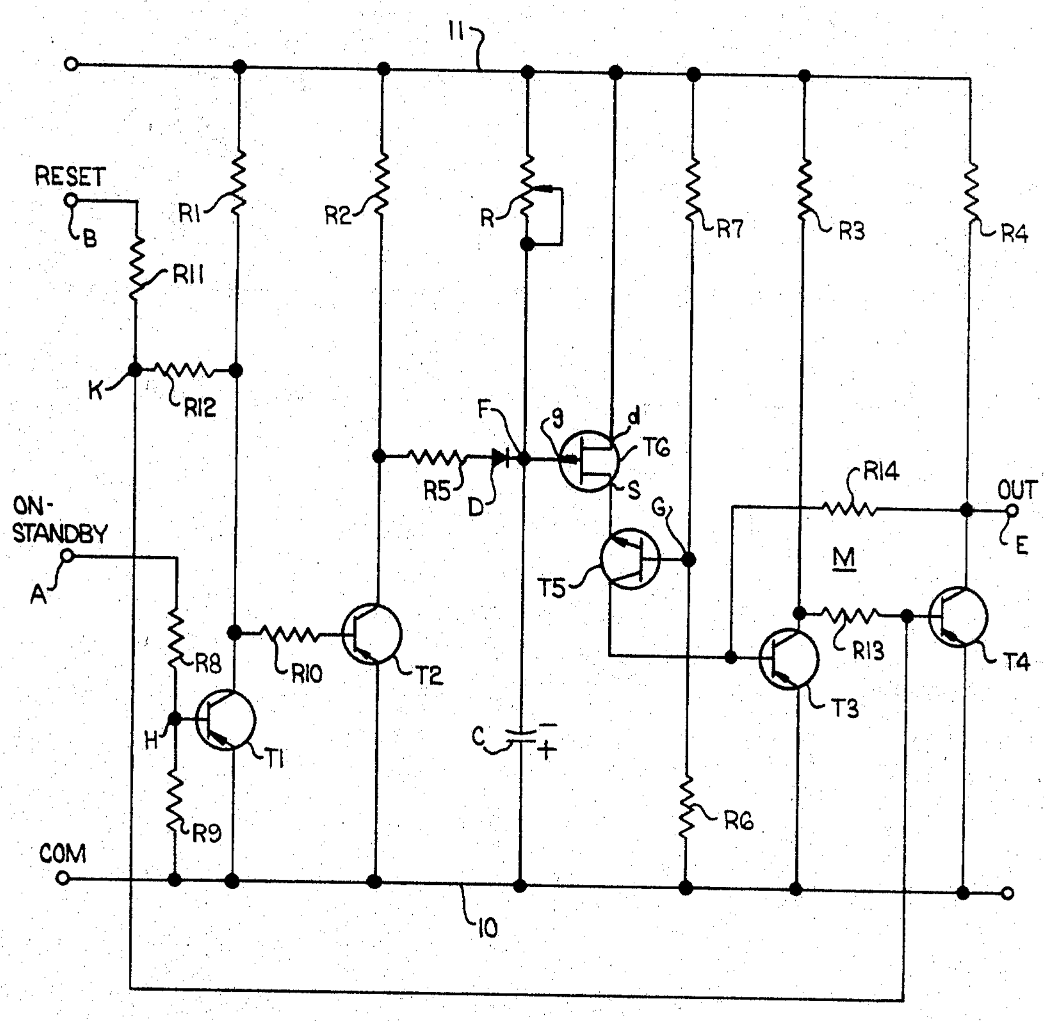
INVENTOR.
ROBERT A. WIECZOREK
BY Gerald J. Patterson & William H. Schmeling United States Patent Office 3,473,054

Patented Oct. 14, 1969

3,473,054

TIME DELAY CIRCUIT WITH FIELD-EFFECT TRANSISTOR

Robert A. Wieczorek, Milwaukee, Wis., assignor to Square D Company, Park Ridge, Ill., a corporation of Michigan Filed Apr. 29, 1966, Ser. No. 546,289

Int. Cl. H03k *17/28*

U.S. Cl. 307—293 9 Claims

ABSTRACT OF THE DISCLOSURE

A solid-state timing circuit which is capable of accurately timing a relatively long interval. The circuit uses a field-effect transistor which has its conduction controlled by an RC timing circuit and a reference voltage each of which are energized by a direct current voltage source so that the variations in the source voltage will not affect the duration of the timing interval.

This invention relates to electrical timing circuits, and more particularly to a completely static resistance-capacitance or RC timing circuit capable of providing a relatively long timing interval and including a field-effect or unipolar transistor as a means for sensing the charge on a capacitor during charging thereof and a transistorized NOR memory as a means for providing an output signal.

When an RC timing circuit must be capable of providing an accurate timing interval immediately upon receipt of a starting signal occurring within a brief interval after power is initially applied to the circuit, it is necessary that the timing interval be measured by the rate of charge of the capacitor and not by the rate of discharge. In timing circuits using a transistor to sense the charge on a capacitor during charging of the capacitor through a timing resistor, the maximum resistance of the timing resistor is determined by the input impedance of the transistor. Because the input impedance of both PNP and NPN injection type transistors is relatively low, the resistance of the timing resistor must be relatively low and thus only relatively short timing intervals can be determined when such transistors are used in such circuits to sense the charge on the capacitor. The improved timing circuit of the present invention uses a field-effect transistor as the charge-sensing means. Because a field-effect transistor has a relatively high input impedance, the timing resistor may have a relatively large resistance thereby to provide a relatively long timing interval.

The principal object of this invention is to provide an improved timing circuit in which a field-effect transistor is used to sense the charge on a timing capacitor.

Another object is to provide an improved timing circuit in which a field-effect transistor is used to sense the charge on a timing capacitor while the capacitor is being charged through a timing resistor.

Another object is to provide an improved timing circuit using a field-effect transistor to sense the charge on a capacitor and in which transistor means responds to an ON signal to start a timing operation and to a STANDBY signal to reset the timing circuit.

Another object is to provide an improved timing circuit in which a transistorized NOR memory serves as an output means.

A further object is to provide an improved RC timing circuit in which a reference voltage is derived from the same source that supplies the charging current thereby to provide timing intervals which are substantially independent of voltage fluctuations.

Other objects and advantages of this invention will become apparent from the following specification wherein reference is made to the drawings which is an elementary wiring diagram of a preferred embodiment.

Referring to the drawing, a timing circuit in accordance with this invention comprises a timing capacitor C, and adjustable timing resistor R, a diode D, a plurality of PNP injection type transistors T1, T2, T3, and T4, an NPN injection type transistor T5, a p-type channel field-effect transistor T6, and a plurality of resistors R1 through R14.

A conductor 10 preferably at zero voltage and a conductor 11 at a suitable negative voltage with respect to the conductor 10 constitute a source of unidirectional voltage for the timing circuit. An input terminal A is provided to receive ON and STANDBY signals, selectively, and a RESET input terminal B is provided to receive RESET signals which function to set the circuit properly when power is initially supplied. The output signals of the timing circuit appear between the conductor 10 and an output terminal E.

The PNP transistors T1, T2, T3, and T4 have their respective emitters directly connected to the conductor 10 and have their collectors connected to the conductor 11 through the resistors R1, R2, R3, and R4, respectively.

The capacitor C is connected in a charging circuit in series with the timing resistor R across the conductors 10 and 11 and a discharge circuit for the capacitor C extends through the emitter-collector path of the transistor T2, the resistor R5, and the diode D.

The field-effect transistor T6 has a drain electrode *d*, a source electrode *s*, and a control gate *g*. The drain electrode *d* is connected directly to the conductor 11, the source electrode *s* is connected directly to the emitter of the transistor T5, and the control gate *g* is connected directly to a junction F between the resistor R and the capacitor C.

The resistors R6 and R7 are preferably of substantially equal resistance and are connected in series with each other across the conductors 10 and 11 to form a voltage divider. The base of the transistor T5 is connected to a junction G between the resistors R6 and R7. This causes the base of the transistor T5 to be maintained at substantially one-half the voltage between the conductors 10 and 11. The collector of the transistor T5 is connected to the base of the transistor T3. As will become apparent, the transistors T5 and T6 are connected in a control circuit that provides a signal voltage upon the transistor T6 becoming conductive.

Both ON signals and STANDBY signals for the timing circuit are selectively applied between the input terminal A and the supply conductor 10. The resistors R8 and R9 are connected in series with each other between the input terminal A and the conductor 10 forming a voltage divider. The base of the transistor T1 is connected to a junction H between the resistors R8 and R9. The collector of the transistor T1 is coupled to the base of the transistor T2 through the resistor R10 and to the base of the transistor T4 through the resistor R12 and a junction K.

The RESET signal for initially setting the timing circuit is applied between the RESET input terminal B and the conductor 10. The terminal B is connected to the base of the transistor T4 through the resistor R11 and the junction K.

The collector of the transistor T3 is connected through a resistor R13 to the base of the transistor T4, and the collector of the transistor T4 is connected to the base of the transistor T3 through the resistor R14 thereby to form a bistable NOR memory M. The output terminal E is connected to the collector of the transistor T4.

A timing interval is started by changing the signal at the input terminal A from a STANDBY signal of substantially zero voltage to an ON signal of a negative voltage which can conveniently be the voltage level of the conductor 11. In the system of logic used herein, this corresponds to a change from a logic "0" signal to logic "1" signal. The timing circuit then operates to cause a change at the output terminal E from substantially zero voltage or logic "0" to approximately the negative voltage level of the conductor 11 or logic "1" after a precise time delay period determined by the capacity of the capacitor C and the selected resistance value of the resistor R. The output signal at the terminal E thereafter remains at logic "1" until a STANDBY signal of logic "0" is applied to the input terminal A. Such a signal at the terminal A effects an instantaneous change in the output signal at the terminal E from a logic "1" to a logic "0." The output signal at the terminal E remains at logic "0" until the expiration of the next timing interval. The operation of the timing circuit will now be explained in detail.

Prior to timing, that is, during standby conditions, a zero voltage or logic "0" STANDBY signal is at the input terminal A and causes the transistor T1 to be nonconductive so that a logic "1" signal appears at the collector of the transistor T1. This logic "1" signal performs two functions.

To perform one of its two functions, the logic "1" signal at the collector of the transistor T1 causes the NOR memory M to be in a standby state and is applied through the resistor R12 and the junction K to the base of the transistor T4 causing the transistor T4 to conduct so that a logic "0" signal appears at the output terminal E. The logic "0" signal at the terminal E is impressed on the base of the transistor T3 through the resistor R14 causing the transistor T3 to be nonconductive and, hence, causing a logic "1" signal to appear at the collector of the transistor T3 which is impressed on the base of the transistor T4 through the resistor R13 to cause the logic "0" signal at the output terminal E to be maintained.

To perform the other of its two functions, the logic "1" signal at the collector of the transistor T1 is impressed on the base of the transistor T2 through the resistor R10 causing the transistor T2 to conduct. The conduction of the transistor T2 completes the discharge circuit which includes the capacitor C, the emitter-collector path of the transistor T2, the resistor R5 and the diode D. When the capacitor C is discharged, the potential at the control gate *g* of the transistor T6 is a small negative voltage determined by the drop across the transistor T2. The small negative voltage at the control gate *g* is sufficiently positive with respect to the voltage at the sorce electrode *s* to bias the transistor T6 against conduction.

A timing interval is started by changing the signal at the input terminal A from a logic "0" to a logic "1" thereby to drive the transistor T1 into conduction. This, in turn, drives the transistor T2 into nonconduction because the conduction of the transistor T1 causes the voltage at the base of the transistor T2 to change from a logic "1" to a logic "0."

The discharge path of the capacitor C through the previously conducting transistor T2 is thus interrupted, and the capacitor C begins to charge through the resistor R. When the charge on the capacitor C increases to a predetermined value, the voltage at the control gate *g* of the transistor T6 relative to the voltage at the source electrode *s* reaches a critical value determined by the characteristics of the transistor T6, and the transistor T6 begins to conduct through the control circuit which includes the base and the emitter electrodes of the transistor T5 and the source and drain electrodes *s* and *d* of the transistor T6. The current from the base to the emitter of the transistor T5 provides a signal that drives the transistor T3 into conduction and, hence, the transistor T4 becomes nonconductive ending the timing period by causing a sudden transition at the output terminal E from a logic "0" signal to a logic "1" signal.

The memory action of the memory M maintains the transistor T4 in its nonconducting state and hence a logic "1" signal remains at the output terminal E until a logic "1" signal appears at the base of the transistor T4 thereby driving it to conduction and switching the memory M to the standby state with a logic "0" at the output terminal E. A logic "1" signal appears a the base of the transistor T4 whenever a logic "0" STANDBY signol is applied at the input terminal A. This is because a logic "0" STANDBY signal at the input terminal A causes the transistor T1 to be nonconductive and the resulting logic "1" signal at its collector is impressed through the resistor R12 and the junction K on the base of the transistor T4 as explained herebefore. It will be apparent that the timing circuit returns to its standby condition if, at any time during or after the timing interval, a logic "1" ON signal at the input terminal A is changed to a logic "0" STANDBY signal.

A RESET signal of logic "1" applied at the reset terminal B at any time when the output terminal E is at a logic "1" also causes the NOR memory to switch to its standby state. This is because a logic "1" signal at the reset terminal B is applied directly to the base of the transistor T4 through the resistor R11.

The primary function of a RESET signal at the reset terminal B, however, is to apply a logic "1" signal on the base of the transistor T4 to assure that the NOR memory M is in its standby state when an ON signal of logic "1" is applied at the input terminal A concurrently with the application of power to the circuit. Without provision for RESET signals of logic "1" at the terminal B, when a logic "1" ON signal is applied at the input terminal A concurrently with the application of power to the circuit, there would be an ambiguity as to the state of the NOR memory M depending on which of the transistors T3 and T4 became conductive first. After the timing circuit is placed in operation, the signal at the terminal B is logic "0" and the timing is controlled solely by the change of signals from ON to STANDBY values at the input terminal A.

I claim:

1. A timing circuit comprising a source of unidirectional voltage, a timing capacitor, a timing resistor, means connecting the timing capacitor and the timing resistor in series with each other in a charging circuit across the source of voltage, switching means operative to render the charging circuit operative and inoperative selectively, a field-effect transistor having a control gate and a pair of main electrodes, means connecting the control gate to the charging circuit so that the voltage at the control gate depends upon the voltage at the capacitor, reference voltage means including a transistor for impressing a compensating reference voltage derived from the source on one of the main electrodes, the reference voltage and the voltage at the control gate being so related when the charging circuit is inoperative and the capacitor is discharged that the field-effect transistor is non-conductive, the voltage at the control gate changing, as the capacitor accumulates a charge when the charging circuit is operative, to a value relative to the reference voltage such that the field-effect transistor becomes conductive, a control circuit connected across the source, means interposing the main electrodes in the control circuit so that the conductivity of the control circuit depends upon the conductivity of the field-effect transistor, and means responsive to the current that flows in the control circuit upon the field-effect transistor becoming conductive to provide a control voltage.

2. A timing circuit as described in claim 1 characterized in that the means operative to render the charging circuit selectively operative and inoperative comprises an electronic switch having its main electrode path connected in parallel with the timing capacitor and in series with the timing resistor, and input signal-receiving means connected to the electronic switch and operative to render the main electrode path of the electronic switch conductive and nonconductive selectively depending upon the nature of a signal at the input-signal receiving means.

3. A timing circuit as described in claim 2 characterized in that the electronic switch is a second transistor, the input signal-receiving means includes a third transistor connected so as to be rendered conductive and nonconductive selectively depending upon the nature of the signal at the input signal-receiving means, and the third transistor is coupled to the second transistor thereby to control the conductivity of the main electrode path of the first transistor.

4. A timing circuit as described in claim 1 characterized in that a transistorized bistable NOR memory having a pair of switching inputs has one of its inputs connected to the control circuit so that the control voltage is impressed thereon, the NOR memory being responsive to the control voltage to switch from one of its bistable states to the other.

5. A timing circuit as described in claim 2 characterized in that a transistorized bistable NOR memory having a pair of switching inputs has one of its inputs connected to the control circuit so that the control voltage is impressed thereon, the NOR memory being responsive to the control voltage to switch from one to its bistable states to the other, the input signal-receiving means includes means to receive a STANDBY signal, the input signal-receiving means is operative upon receipt of a STANDBY signal to render the main electrode path of the electronic switch conductive, the other input of the NOR memory is connected to the input signal-receiving means, and the NOR memory is responsive to the STANDBY signal to change from said other of its bistable states to said one of its bistable states.

6. A timing circuit as described in claim 1 characterized in that the main electrodes comprise a drain electrode and a source electrode, the drain electrode is directly connected to one side of the power source, and the reference voltage means including the transistor impresses the reference voltage on the source electrode.

7. A timing circuit as described in claim 6 characterized in that the reference voltage means comprises a voltage divider connected across the source, and the transistor has its base electrode connected to an intermediate point on the voltage divider and its emitter-collector circuit connected in the control circuit in series with the main electrodes of the field-effect transistor, the emitter of the transistor being connected to the source electrode of the field-effect transistor, and the control voltage appearing at the collector of the transistor.

8. A timing circuit as described in claim 7 characterized in that a transistorized bistable NOR memory having a pair of inputs has one of its inputs connected to the collector of the transistor so that the NOR memory is responsive to the control voltage to change from one of its bistable states to the other.

9. A timing circuit comprising a source of unidirectional voltage, a timing capacitor, a timing resistor, means connecting the timing capacitor and the timing resistor in series with each other in a charging circuit across the source of voltage, a discharge circuit for the capacitor, switching means operative to render the charging circuit and the discharge circuit operative alternately thereby to change the voltage at one terminal of the capacitor, a field-effect transistor having a control gate and a pair of main electrodes, means connecting the control gate to said one terminal of the capacitor so that the voltage at the control gate depends upon the voltage at said one terminal, a voltage divider connected across the source, a control transistor having its base electrode connected to an intermediate point on the voltage divider and its emitter-collector circuit connected in a control circuit in series with the main electrodes of the field-effect transistor, the voltage at the intermediate point of the voltage divider being impressed on one of the main electrodes of the field-effect transistor through the base-emitter circuit of the control transistor, the voltage on said one of the main electrodes and the voltage at the control gate being so related that the field-effect transistor is rendered conductive and non-conductive alternately as the voltage at said one terminal of the capacitor changes, the collector of the control transistor being responsive to provide a control voltage upon the field-effect transistor becoming conductive.

References Cited

UNITED STATES PATENTS

| | | | |
|---|---|---|---|
| 2,920,215 | 1/1960 | Lo | 307—291 |
| 3,299,288 | 1/1967 | McDowell et al. | 307—293 |
| 3,336,503 | 8/1967 | White | 307—304 |

ARTHUR GAUSS, Primary Examiner

B. P. DAVIS, Assistant Examiner

U.S. Cl. X.R.

307—251, 304